United States Patent [19]
Boscher

[11] Patent Number: 5,596,662
[45] Date of Patent: Jan. 21, 1997

[54] MULTICHANNEL OPTICAL CONNECTION METHOD FOR OPTICAL FIBERS

[75] Inventor: Daniel Boscher, Trebeurden, France

[73] Assignee: France Telecom, France

[21] Appl. No.: 399,160

[22] Filed: Mar. 2, 1995

[30] Foreign Application Priority Data

Mar. 3, 1994 [FR] France ................................. 94 02458

[51] Int. Cl.[6] .......................................... G02B 6/36
[52] U.S. Cl. ................ 385/55; 385/50; 385/52; 385/56; 385/65; 385/83
[58] Field of Search ............................... 385/55, 56, 63, 385/59, 60, 62, 65, 69, 71, 76, 83, 50, 52

[56] References Cited

U.S. PATENT DOCUMENTS

| | | | |
|---|---|---|---|
| 4,252,407 | 2/1981 | Bubanko et al. | 385/59 |
| 4,279,468 | 7/1981 | Turley et al. | 385/59 |
| 5,016,972 | 5/1991 | Schlaak | 385/65 |
| 5,103,680 | 4/1992 | Kanayama et al. | 73/849 |
| 5,297,228 | 3/1994 | Yanagawa et al. | 385/83 |
| 5,315,678 | 5/1994 | Maekawa et al. | 385/65 |
| 5,337,384 | 8/1994 | Basavanhally et al. | 385/56 X |
| 5,379,360 | 1/1995 | Ota et al. | 385/59 |
| 5,384,870 | 1/1995 | Lieber | 385/50 |
| 5,388,174 | 2/1995 | Roll et al. | 385/83 |
| 5,416,868 | 5/1995 | Kakii et al. | 385/59 X |

FOREIGN PATENT DOCUMENTS

| | | |
|---|---|---|
| 0249237 | 12/1987 | European Pat. Off. . |
| 0514722 | 11/1992 | European Pat. Off. . |
| 0571924 | 12/1993 | European Pat. Off. . |
| 2660443 | 4/1991 | France . |

*Primary Examiner*—Rodney B. Bovernick
*Assistant Examiner*—Hemang Sanghavi
*Attorney, Agent, or Firm*—Blakely Sokoloff Taylor & Zafman

[57] ABSTRACT

A multichannel optical connection process starts with making a wafer having a plurality of optical outlets disposed on a common face. The wafer is then disposed on a support having mechanical positioning arrangements, after which the assembly comprising the connecting wafer and the support is aligned with a reference termination having a base with mechanical positioning arrangements and a plate with at least two optical outlets disposed in the same configuration as the connecting plate. The two outlets of the wafer are then dynamically aligned with the outlets of the plate by three independent relative displacements of the wafer and the support. The wafer is fixed to the support when the alignment is achieved.

31 Claims, 5 Drawing Sheets

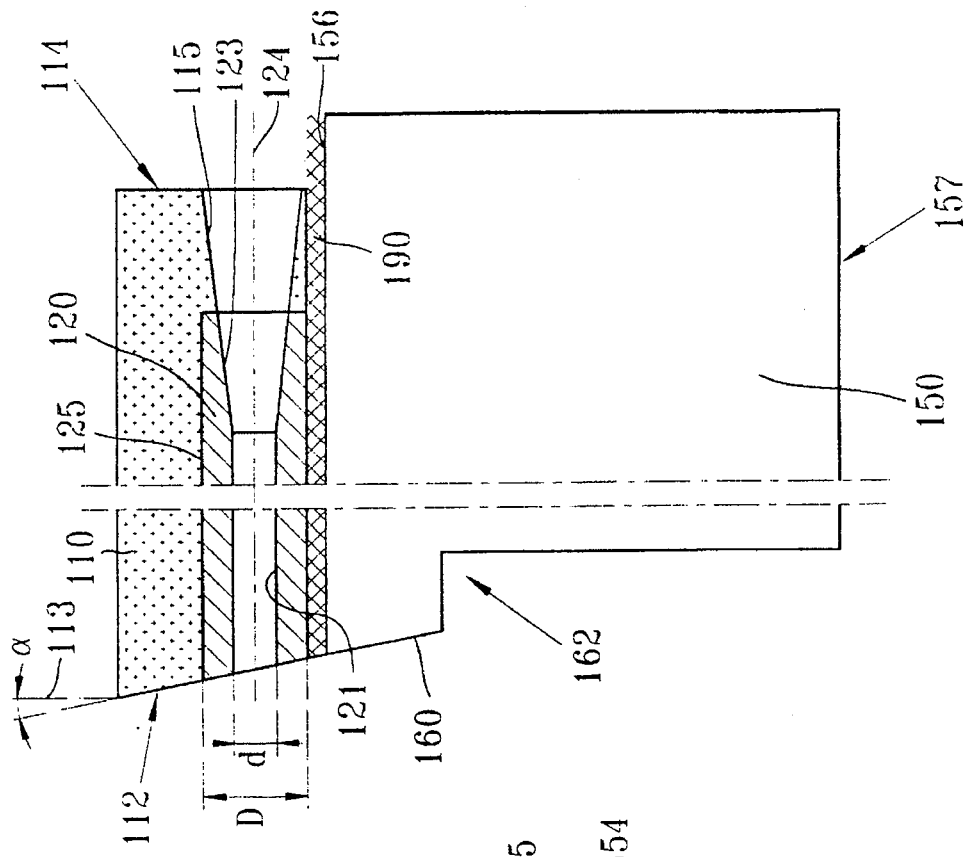
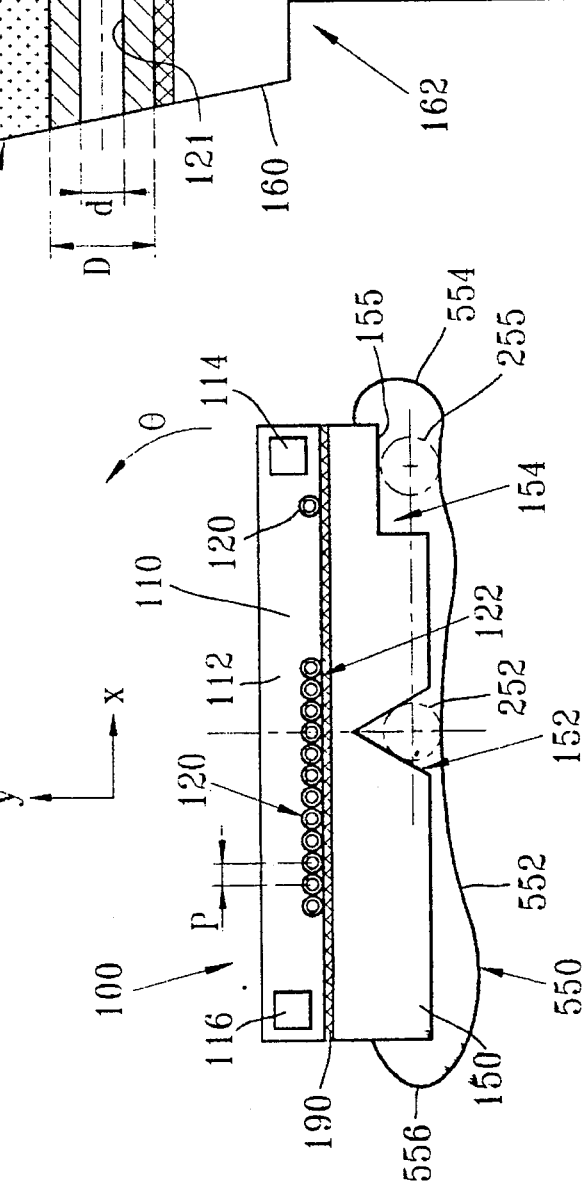

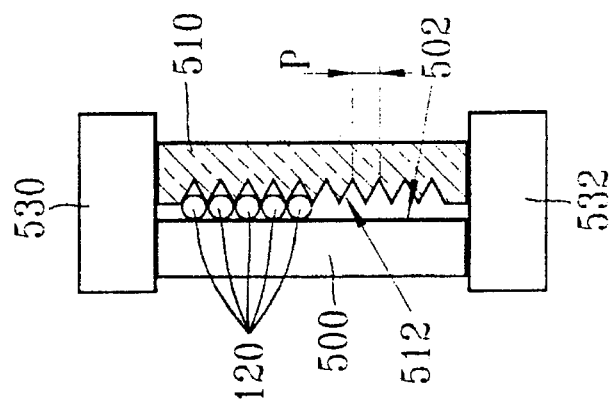
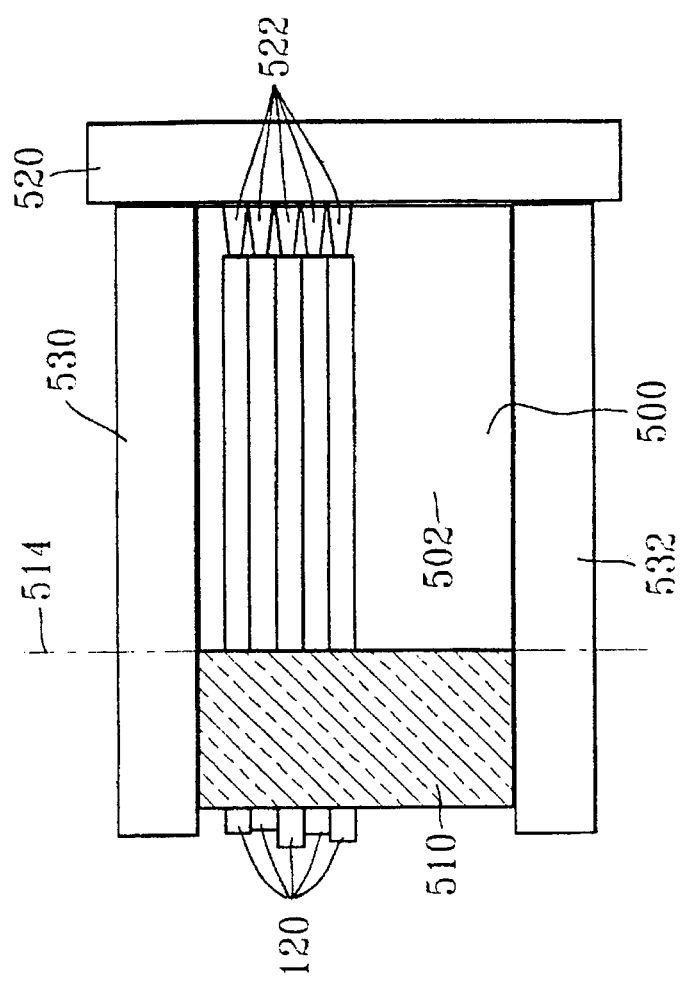

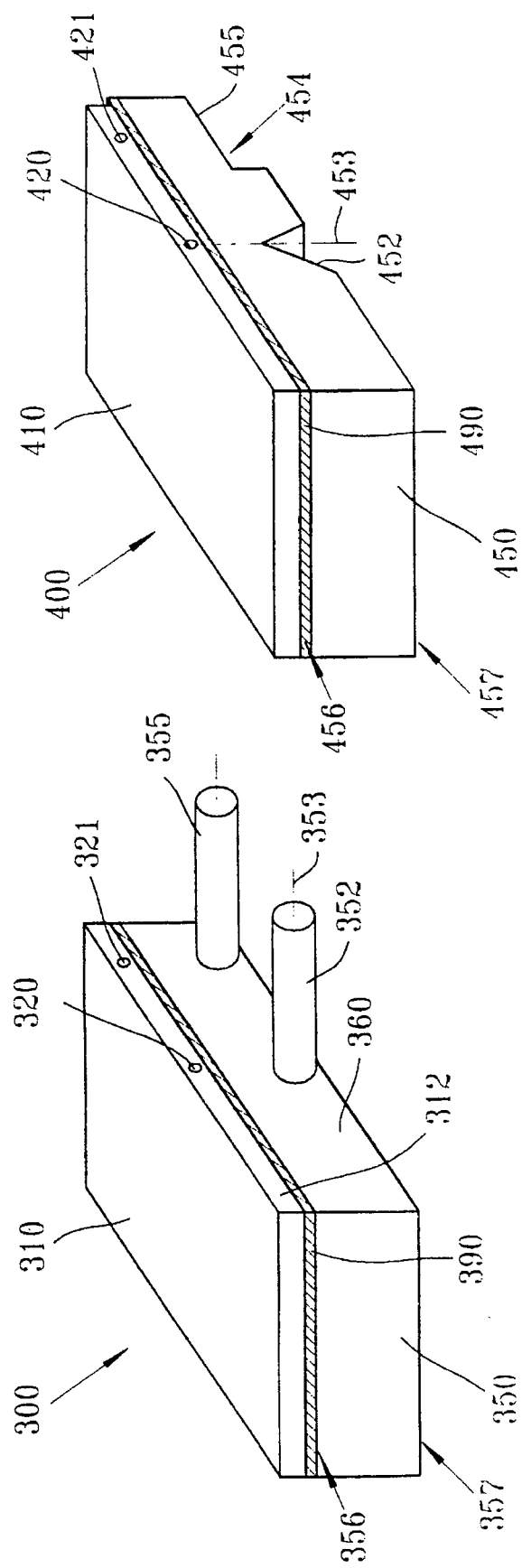

MULTICHANNEL OPTICAL CONNECTION METHOD FOR OPTICAL FIBERS

BACKGROUND OF THE INVENTION

1. Field of the Invention

The present invention concerns fiber communication systems.

To be more precise, the present invention relates to the field of multichannel optical connection means designed to connect a plurality of optical fibers simultaneously to a planar optical component or to connect a plurality of optical fibers of one cable to a plurality of optical fibers of another cable.

2. Description of the Prior Art

Until now optical fibers have mainly been used in long distance transmission systems, trunk networks and interexchange networks.

From now on, however, optical fibers will be increasingly used in distribution networks with fiber terminations in distribution chambers in buildings and eventually in the home.

As the number of customers concerned increases, the overall economics of the network become of vital importance.

Two contrasting scenarios using two types of architecture are emerging for the design of these networks.

In accordance with the first scenario a single down channel serves multiple users by means of multiplexers, couplers, and splitters.

The cost of the sender component and the fiber is therefore shared between the users so served.

In accordance with the second scenario, there is one fiber per user but the send and receive components are treated collectively. This simplifies network management and there is a saving in terms of the integration factor of the component strips used.

These contrasting options necessarily entail:

coupling of send and receive components to couplers and to splitters and then to the fibers themselves, and coupling of the send component strips to guides and then to the fibers.

Although these functions are at present implemented by assembling discrete components, the cost of the latter, the lengths of intermediate fiber used, the connectors required and the associated space requirements soon make these uncompetitive in comparison with the planar optics technique and its associated functions usually called OEIC.

The well-known principle of planar optics consists in forming optical waveguides of appropriate geometry on plane substrates which can be made from glass, silicon, silica, lithium niobate or even polymer materials, for example.

As indicated in the article "Status of glass and silicon-based technologies for passive components, Martin Mac Court IOOC 93", there are currently three techniques for aligning an optical fiber with the axis of an optical waveguide or of a second fiber and maintaining their relative positioning after alignment.

The first technique is a dynamic alignment technique of optimizing the power transmitted from the fiber to the guide or from fiber to fiber, and then gluing the fiber and the guide (or the other fiber) together.

The second technique is a static alignment technique of etching very high precision V-grooves on a substrate.

The third technique is a semi-static alignment technique of bonding fibers into highly accurate V-grooves and micropositioning of the resulting structures in line with a substrate.

These solutions are not entirely satisfactory, however.

The first solution is time-consuming and the time taken is proportional to the number of outlet fibers to be aligned.

The formation of high-precision V-grooves in a substrate, as required for the second and third solutions, is a costly high-technology operation.

The techniques used until now, as outlined above, have the further major disadvantages of not allowing disconnection of the fibers, of poor stability, and of not easily achieving low levels of reflection at the component.

An object of the present invention is to improve multichannel optical connection devices for optical fibers.

To be more precise, subsidiary objects of the invention are:

to reduce connection costs compared to the prior art, to allow disconnection of the optical fibers, to enable gluing on site, to achieve low levels of reflection, and to achieve better stability than existing products.

SUMMARY OF THE INVENTION

The invention consists in a multichannel optical connection process, in particular for optical fibers, comprising the following steps:

making a multichannel optical connection wafer having a plurality of optical outlets disposed on a common face in a predetermined configuration and with a precise pitch, disposing said connection wafer on a support having mechanical positioning means, placing the assembly comprising said connection wafer and said support facing a complementary reference termination comprising a reference face having mechanical positioning means adapted to cooperate with those of said support to define a unique relative position between them and a multichannel optical connection reference plate fixed rigidly to said base and having on a common face at least two optical outlets disposed in the same predetermined configuration as said connecting wafer, dynamically aligning two outlets of said connection wafer with respective outlets of said connection plate by three independent relative movements between said connection wafer and the associated support, and fixing said connection wafer to said support when said alignment is obtained.

To connect a multiple optical fiber cable to an associated system, second multiple optical fiber cable or planar optical component, it is sufficient to equip said cable and said associated system with an assembly of this kind comprising a multichannel optical connection wafer and a support with accurately defined relative positions and to assemble these two assemblies together using their respective mechanical positioning means.

In the context of the invention, the reference termination can be a universal (i.e. general purpose) termination if it is potentially necessary to connect the connection wafer/support assembly to a plurality complementary assemblies. In this case, said complementary assemblies are themselves constituted from the same universal reference termination.

Alternatively, the reference termination can be constituted by an assembly comprising a connection wafer and a support fixed together beforehand in an arbitrary manner if there is no requirement for the connection to be universal.

In accordance with one advantageous feature of the invention said predetermined configuration of said optical outlets of said connection wafer corresponds to a coplanar disposition of the axes of said outlets.

In accordance with another advantageous feature of the invention the complementary mechanical positioning means comprise a precision cylindrical peg on said support of said reference bases and a V-groove on said reference base or said support, respectively.

In accordance with another advantageous feature of the invention the complementary mechanical positioning means further comprise a precision cylindrical peg on said support or said reference base and a bearing plane on said reference base or said support, respectively.

In accordance with another advantageous feature of the invention the two cylindrical pegs are on said support or on said reference base and said V-groove and said bearing plane are on said reference base or said support, respectively.

In accordance with another advantageous feature of the invention the two aligned outlets of said positioning wafer comprise an outlet disposed substantially in the plane of symmetry of said predetermined configuration and a second outlet that is not in said plane of symmetry.

In accordance with another advantageous feature of the invention the plane of symmetry of said predetermined configuration is substantially coincident with the plane of symmetry of said V-groove and/or of the associated cylindrical peg.

Other features, objects and advantages of the present invention will emerge from a reading of the following detailed description given by way of non-limiting example with reference to the appended drawings.

BRIEF DESCRIPTION OF THE DRAWINGS

FIG. 2 is an end-on lateral view of one of these assemblies.

FIG. 3 shows part of this same assembly in longitudinal section.

FIG. 4 shows an intermediate step in the fabrication of one of the connection assemblies.

FIG. 5 is an end-on view of the component shown in FIG. 4 during the same fabrication step.

FIGS. 6 and 7 are diagrammatic perspective views of two reference terminations used in the context of the present invention.

DETAILED DESCRIPTION OF THE PREFERRED EMBODIMENTS

Figure 1:
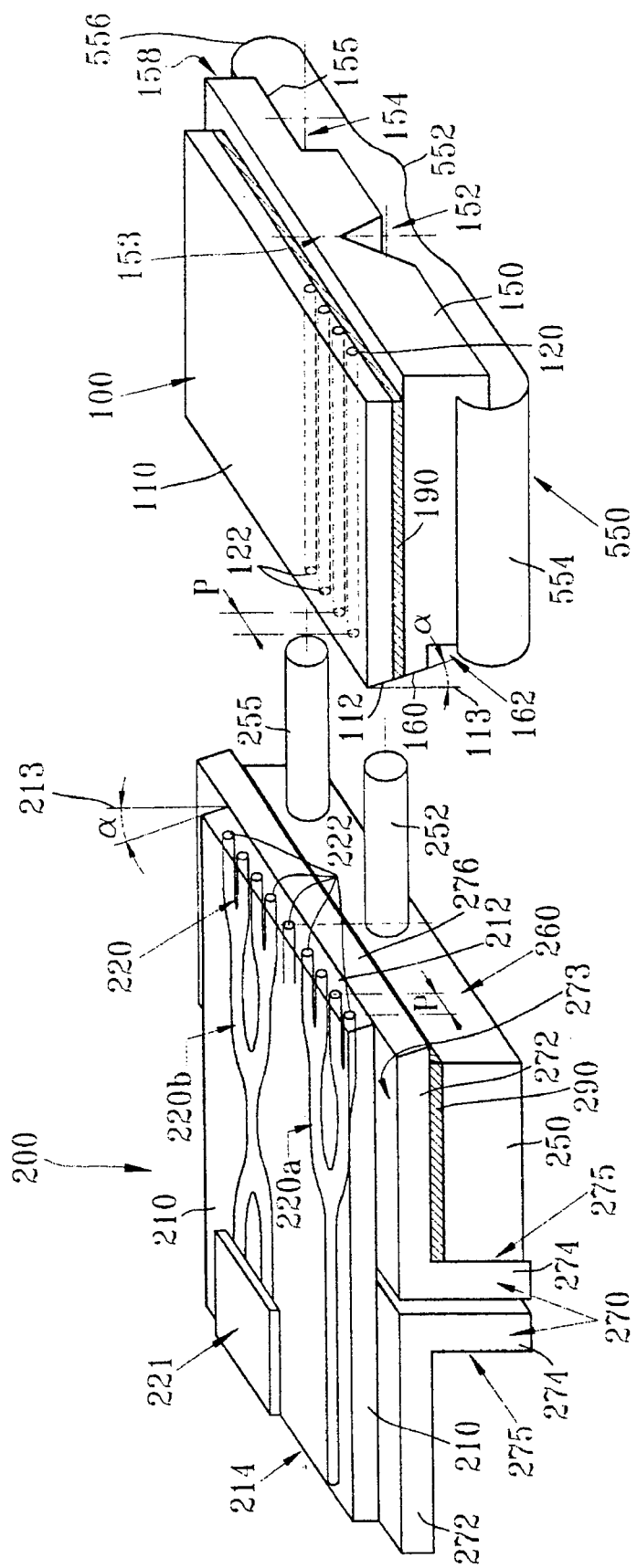
FIG. 1 is a diagrammatic perspective view of two assemblies of a multichannel optical connection system in accordance with the present invention, before they are joined together.

The appended FIG. 1 shows a connection system in accordance with the present invention comprising a connector assembly 100 adapted to receive a plurality of optical fibers and an assembly 200 comprising a substrate 210 with a corresponding number of optical waveguides 220.

Each of the assemblies 100 and 200 comprises a wafer 110, 210 on a support 150, 250.

The wafers 110, 210 each have a plurality of optical outputs 122, 222 disposed on a common face 112, 212 of the wafers 110, 210 in a predetermined configuration and with a precise pitch p. To be more precise, in the preferred embodiment of the invention shown in the appended figures said predetermined configuration of the optical outputs 122, 222 corresponds to a coplanar disposition of the axes of said outputs. Also, the pitch p of the optical outputs 122, 222 is identical on both wafers 110, 210 forming the respective assemblies 100, 200.

The supports 150, 250 comprise respective complementary mechanical positioning means 152, 155 and 252, 255 described in detail below and adapted to define a unique relative position of the two supports 150 and 250.

There is next described the preferred process for fabricating the connector assembly 100 adapted to receive a plurality of optical fibers. The first step is to make the plane and generally parallelepipedal wafer 110 comprising ferrules 120 with coplanar parallel axes.

The ferrules 120 have an outside diameter D less than the pitch p of the optical outputs and an inside diameter d to suit the outside diameter of the optical fibers they are to receive, typically in the order of 126 µm.

The person skilled in the art knows how to make accurate ferrules for receiving optical fibers, in particular using known fiber drawing techniques. The process of fabricating such ferrules 120 is not described hereinafter for this reason. In particular, the person skilled in the art knows how to make silica ferrules whose outside diameter D, inside diameter d and eccentricity between the inside diameter d and the outside diameter D are defined to an accuracy of 1 micron.

Referring to FIG. 3, the internal passage 121 of each ferrule 120 preferably has a conical end 123 to facilitate insertion of the optical fibers into said ferrules.

Referring to FIGS. 4 and 5, to make a wafer 110 with n channels adapted to receive the fibers in a common plane and at a precise pitch p, n ferrules 120 are placed on a plane reference surface 502 formed on a member 500.

To be more precise, the n ferrules 120 are pressed onto the reference surface 502 by a high-precision wafer 510 having V-grooves 512 of very precise depth and pitch p.

The wafer 510 can be of the type used in the conventional prior art processes, for example an etched silicon wafer. An etched silicon wafer 510 is undoubtedly costly. However, in the context of the invention, the wafer 510 is used only to position the ferrules 120. It is not an integral part of the connection assembly and consequently can be used an unlimited number of times.

At the end of the ferrules 120, to be more precise facing their conical ends 123 is a locating member 520 carrying cones 522 at the same pitch p as the grooves 512 in the wafer 510. The cones 522 engage in the conical ends 123 of the ferrules 120 and have the same cone angle as the latter. The cones 522 therefore block off the entries 123 of the ferrules 120.

The reference plate 500 has two lateral walls 530, 532. After placing the ferrules 120, the grooved wafer 510 and the chock 520 as described, the ferrules 120 are embedded in a molding resin cast in the space between the grooved wafer 510, the locating member 520 and the walls 530, 532.

This molding operation produces the wafer 110. After it, the ends of the ferrules 120 which project from the wafer 110 are sawn off in a plane 514 (FIG. 4) at which the molded wafer 110 and the grooved component 510 meet.

This yields a thermoplastic material wafer 110 containing the ferrules 120 with parallel and coplanar axes 124. The ferrules 120 are disposed in passages 125 which respectively open onto the aforementioned face 112 of the wafer 110 and onto its opposite face 114.

To be more precise, the conical ends 123 of the ferrules 120 open into pre-centering cones 115 formed by the cones 522 and which themselves open onto the outside face 114 of the wafer 110. The opposite ends of the ferrules 120 are flush with the outside surface 112 of the wafer 110.

The resulting wafer 110 is placed on a support 150. The support 150 is preferably a rectangular parallelepiped. The support 150 has two plane parallel main faces 156, 157.

The wafer 110 is disposed on the first face 156 of the support 150.

The support 150 has mechanical positioning means on its second face 157.

To be more precise, the support 150 preferably has a V-groove 152 on its face 157. The V-groove 152 is preferably in a plane of symmetry 153 of the support 150 orthogonal to the aforementioned faces 156, 157.

The support 150 has on the same face 157 a rebate 154 adjacent one lateral face 158 of the support. The rebate 154 defines a plane bearing surface 155 parallel to the main faces 156 and 157 of the support 150 and which opens onto its lateral surface 158.

In the context of the invention, there are no particular dimensional accuracy requirements with regard to the groove 152 or the rebate 154. They are merely required to be flat.

The support 150 preferably has a rebate 162 adjacent to its lower surface 157 on its transverse face 160 orthogonal to the previously mentioned main faces 156, 157 and lateral face 158 and which coincides with the aforementioned face 112 of the wafer 110. The purpose of the rebate 162 is to facilitate inclined polishing of the face 112 of the wafer 110 and of the corresponding face 160 of the support 150 and the ends of the ferrules 120 (see below).

The resulting assembly comprising the wafer 110 disposed on the support 150 is then placed on a reference termination 300 of the type shown in FIG. 6.

This reference termination 300 includes a reference plate 310 and a reference base 350.

The reference plate 310 comprises two optical waveguides 320, 321. The optical waveguides 320, 321 can be optical fibers, possibly optical fibers in ferrules similar to the ferrules 120; they can instead be fabricated using planar optics technology.

The optical waveguides 320, 321 have their outlet on a common face 312 of the reference plate 310. These outlets correspond to the predetermined configuration of the ferrules 120 in the wafer 110.

The reference base 350 comprises mechanical positioning means complementary to the groove 152 and the bearing surface 155 on the support 150.

In the preferred embodiment of the invention shown in FIG. 6 the mechanical positioning means of the reference base 350 comprise two precision cylindrical pegs 352, 355. The two pegs 352, 355 preferably have parallel axes. They project from a transverse lateral face 360 of the support base 350. The pegs 352, 355 preferably have the same diameter.

The axes of the pegs 352, 355 are parallel to the main faces 356, 357 of the support base 350 and orthogonal to its transverse face 360.

One of the reference optical waveguides 320 is preferably in a plane of symmetry of the base 350 perpendicular to the aforementioned faces 356, 357 and 360 of the base 350. This plane of symmetry preferably coincides with the axis 353 of the peg 352.

The optical waveguide 321 is preferably the outermost waveguide in the predetermined configuration adopted.

The axes of the outlets of the optical waveguides 320, 321 are in a plane parallel to the plane passing through the axes of the pegs 352, 355. Finally, the distance between the axes of the outlets of the optical waveguide 300, 321 is preferably equal to the distance between the axes of the pegs 352, 355. In other words, the optical waveguides 320, 321 are vertically aligned with the respective pegs 352, 355 and the distance between the axis of the waveguide 320 and the peg 352 is equal to the distance between the axis of the waveguide 321 and the peg 355.

Accordingly, the distance between the axes of the two optical waveguides 321 is a multiple of the pitch p of the configuration adopted.

As shown in FIG. 6, the reference plate 310 is fixed to the reference support base 350 by means of a layer of glue 390 or alternatively by welding or any equivalent technique.

As an alternative to this, the reference plate 310 and the reference support base 350 can be made in one piece.

In the assembly 100 the depth of the V-groove 152 and of the rebate 154 are preferably such that when the assembly 100 is resting on the reference termination 300 the plane passing through the axes of the ferrules 120 is parallel to the plane containing the axes of the pegs 352, 355 and coincides with the plane passing through the axes of the reference optical waveguides 320, 321.

After positioning the wafer 110 on the support 150 in this way, respecting the symmetry of the ferrules 120 relative to the groove 152, the wafer 110/support 150 assembly is placed on the reference termination 300. Because of the cooperation defined between the pegs 352, 355 and the groove 152 and the bearing surface 355, respectively, the support 150 is located in a unique position relative to the reference support base 350 and therefore relative to the reference plate 310 which is attached to it.

The positioning of the central ferrule 120 on the central reference optical waveguide 320 is optimized by microdisplacements between the wafer 110 and the support 150 in x and y directions, controlled (for example) by monitoring the transmitted flux. By "microdisplacement in x and y directions" is-meant a relative displacement between the wafer 110 and the support 150 in two directions orthogonal to each other and orthogonal to the axes of the pegs 352, 355, the x direction being parallel to the main faces 156, 157 of the support and the y direction being orthogonal to these main faces 156, 157 (see FIG. 2).

By "monitoring the transmitted flux" is meant monitoring of the power of the flux transmitted between the central ferrule 120 and the optical waveguide 320 during this microdisplacement.

Again by monitoring the transmitted flux, for example, relative rotation between the plate 110 and the support 150 about an axis substantially coincident with the central optical waveguide 320 in the direction of the arrow θ (see FIG. 2) aligns the outside ferrule 120 with the outside reference guide 320.

When these operations have been completed, the ferrules 120 occupy the same position relative to the mechanical positioning means 152, 155 as the reference waveguides 320, 321 of the reference termination occupy relative to the pegs 352, 355.

The relative positions of the wafer 110 and the support 150 are then fixed by any appropriate conventional means, for example by welding or by means of a layer of glue 190 between the wafer 110 and the support 150.

The pre-alignment of the central ferrule 120 guarantees a symmetrical distribution of displacements due to dimensional variations associated with thermal effects and therefore a minimal error relative to the optimized initial position.

The assembly 100 previously described is then ready for use.

The assembly 200 including the substrate 210 is prepared in a similar manner.

The substrate 210 is in the form of a plane wafer with optical waveguides 220 whose outlets 222 are on a common face 212 with the same predetermined configuration and the same precise pitch p as the ferrules 120 on the wafer 110. Integrated optical technologies which usually employ photolithography and masking techniques can now fabricate the optical waveguides 220 at an extremely accurate pitch (to within better than 0.5 μm). The depth of the optical waveguides 220, usually formed by diffusion, deposition or selective etching, also yields an accuracy to within one micron.

In a similar way to the assembly 100, the assembly 200 is positioned on a support 250. The substrate 210 can be fixed direct to the support 250. However, the substrate 210 is preferably fixed first to an intermediate support member 270. This intermediate support member 270 is needed to compensate for the fact that the height of the substrates 210 can differ markedly from one substrate to another, depending on the technologies used. This intermediate member 270 preferably has an L-shape cross-section. The intermediate member 270 comprises two orthogonal branches 272, 274. The longer branch 272 supports the outside surface 273 of the substrate 210. The inside surface 275 of the shorter branch 274 constitutes a reference surface perpendicular to the axes of the optical waveguides 220 and provides an abutment for the support 250.

The substrate 210 can be fixed to the intermediate support 270 by any appropriate conventional means.

Like the reference base 350 of the termination 300 previously described, the support 250 has mechanical positioning means adapted to cooperate with the V-groove 152 and the bearing surface 155 of the assembly 100.

Accordingly, the support 250, which is a rectangular parallelepiped, comprises two precision pegs 252, 255 projecting from its transverse face 260.

The pegs 252, 255 can be identical as to their geometry, dimensions and relative disposition to the aforementioned pegs 352, 355. For this reason the pegs 252, 255 are not described in more detail below.

The assembly 200 comprising the wafer 210 disposed on the support 250 and the intermediate support 270 is then placed on a complementary reference termination 400 of the type shown in FIG. 7.

The reference termination 400 comprises a reference plate 410 and a reference support base 450.

The reference plate 410 comprises two reference optical waveguides 420, 421 homologous to the respective optical waveguides 320, 321 on the reference termination 300. In other words, the predetermined configuration of the optical waveguides 420, 421 is the same as the predetermined configuration of the waveguides 320, 321.

The support base 450 comprises mechanical positioning means 452, 454, 455 complementary to the pegs 252, 255 on the support 250. The mechanical positioning means 452, 454, 455 are identical to the groove 152, the rebate 154 and the bearing surface 155 on the support 150.

Accordingly, the support 450 comprises a V-groove 452 and a rebate 454 delimiting a bearing surface 455 which opens onto its lower surface 457. The optical waveguide 420 and the groove 452 are preferably in the plane of symmetry 453 of the termination 400.

The wafer 410 is fixed to the upper surface 456 of the support base 450 by any appropriate means, for example by soldering or by means of a layer of glue 490.

The positioning of the guides 420, 421 relative to the mechanical positioning means 452, 455 is such that when the reference termination 400 is placed on the pegs 352, 355 of the reference termination 300 the optical waveguides 420, 421 are respectively aligned with the optical waveguides 320, 321.

After thus placing the reference termination 400 on the pegs 252, 255 of the support 250 of the assembly 200, the substrate 210 is adjusted by microdisplacement in the x and y directions relative to the support 250, controlled (for example) by monitoring the transmitted flux, to align the central optical waveguide 220 with the central reference optical waveguide 420. Then rotation of the substrate 210 relative to the support 250 about an axis substantially coincident with that of the central reference waveguide 420 aligns the external optical waveguide 220 with the reference optical waveguide 421.

Once these operations have been completed the optical waveguides 220 on the substrate 210 occupy the same position relative to the pegs 252, 255 as the reference waveguides 420, 421 relative to the groove 452 and the bearing surface 455.

The substrate 210 and the support 250 are then fixed in this optimized position by welding or by means of a layer of glue 290 between the intermediate support 270 and the support 250.

In the implementation as previously described, the two assemblies 100 and 200 are each positioned relative to complementary universal reference terminations 300, 400. Accordingly, for both assemblies 100 and 200, the ferrules 120 and optical waveguides 220 occupy a precise universal position relative to the respective mechanical positioning means 152, 155 and 252, 255.

Both assemblies 100 and 200 are therefore universal assemblies and can be combined or mixed and matched by family.

The accuracy of the alignment of the waveguides 220 and the fibers in the ferrules 120 is guaranteed by a non-trivial optimization operation which entails monitoring the transmitted flux, it is true. Nevertheless, in the context of the invention this operation is carried out once and for all for the assembly 100 and once and for all for the assembly 200, and thereafter several tens of waveguides 220 can be connected simultaneously. Accordingly, compared to the prior art, the relative cost of the two operations is low because it is divided by the number of fibers connected.

In one variant of the above embodiment, after positioning one of the assemblies 100 or 200 relative to a reference termination 300, 400 it is possible to position the second assembly 200 or 100 relative to the complementary assembly 100 or 200 positioned previously relative to the reference termination 300, 400.

In a further variant, if the assemblies 100, 200 are not required to be universal assemblies, one of the assemblies 100 or 200 can be fixed arbitrarily by fixing its wafer 110 or 210 arbitrarily relative to its support 150 or 250 and then, by micromanipulation along the x and y axes and by the rotation angle θ the second wafer is positioned relative to the first. In this case the delicate micropositioning operations are carried out in respect of one only of the two assemblies 100 and 200.

Dynamic alignment on one assembly 100 or 200 or on both assemblies 100 and 200 can naturally be carried out using waveguides and ferrules fitted with fibers which are those subsequently used in the component or by means of waveguides and ferrules fitted with fibers which are used only for the optimization operation.

To obtain a component whose characteristics are stable with temperature, independently of the operation of centering the V-groove 152/peg 252 on the axis of the two assemblies, the dimensions of the support 150, the support base 250 and the intermediate support member 270 are made as small as possible and materials with coefficients of thermal expansion and Young's moduli compatible with the required effect are preferably chosen.

To obtain low coefficients of reflection for these components, an important characteristic in some telecommunication applications, the faces 112, 212 of the wafers 110, 210 onto which open the outlets 122, 222 of the ferrules 120 and the optical waveguides 220 can be prepared by machining them at an angle α relative to a plane 113, 213 orthogonal to the axes of the ferrules 120 and the waveguides 220. To be more precise, said faces 112 and 212 of the complementary wafers 110 and 210 are machined with complementary angles α, i.e. equal and opposite angles.

The optical fibers can be fitted into the ferrules 120 in the factory or on site.

In the context of the invention, it is also possible to produce a termination forming a connector adapted to connect on one side to a component 200 comprising an OEIC type substrate 210 and on the other side to a standard connector, for example a single-fiber connector.

The assemblies 100 fitted with the fibers and the substrate 210 can be polished with a device enabling the above-defined angle α to be produced. The rebate 162 in the support 150 facilitates such polishing. For the same reasons, the transverse face 260 of the support 250 is preferably set back from the transverse face 276 of the intermediate support 270 which coincides with the exit face 212 of the substrate 210.

The two assemblies 100, 200 prepared as described above can be joined together by any appropriate means. The two assemblies 100, 200 are preferably joined together by elastically engaging the two pegs 252, 255 respectively in the V-groove 152 and against the bearing surface 155, by means of a leaf spring 550.

This leaf spring is preferably U-shape with a central core 552 and two lateral branches 554, 556.

The central core 552 bears on the pegs 252, 255. The curved lateral branches 554, 556 are adapted to engage with the longitudinal lateral surfaces of the support 150.

To procure close proximity between the respective outlets 122, 222 of the optical fibers in the assembly 100 and the optical waveguides 220 on the substrate 210, but without contact (to prevent damage to the outlet faces 122, 222), especially if there is likely to be a large number of connection/disconnection operations, two pads 114, 116 as shown in FIG. 2 can be fixed to at least one of the outlet faces 112, 212 of the wafers 110, 210. The pads 114, 116 have a thickness equal to the gap between said outlets 122, 222 of the optical means.

An index matching gel or a glue can be disposed between the two assemblies 100, 200 to improve the optical transmission qualities.

The use of such gel and the isostatic system of reference without play defined between the V-groove 152, the bearing surface 155 and the two pegs 252, 255 guarantee excellent stability on connecting or disconnecting the system.

Two particular applications are feasible in the context of the invention, shown diagrammatically in FIG. 1.

If the substrate wafer 210 comprises only passive planar waveguides 220a, the two transverse faces 212, 214 of the substrate can be prepared symmetrically in order to position accurately optical fiber connection assemblies comparable to the assembly 100 shown in FIG. 1 facing two ends of the waveguides 220a, i.e. respectively facing the transverse faces 212 and 214 of the substrate wafer 210. In this case the substrate wafer 210 is associated with two intermediate supports 270 and two symmetrical supports 250. The relative positioning of the substrate wafer 210 and the respective symmetrical supports 250 each provided with pegs 252, 255 is carried out by micromanipulation (in the x and y directions and by the angle θ—see above) relative to a reference termination, as previously explained.

One specific application is, for example, connecting primary couplers with one input and two outputs by connecting a single plug corresponding to dozens of unit couplers.

In other applications the substrate 210 can comprise optical waveguides 220b positioned in front of active components 221. In this case the wafer 210 is associated with only one support 250 and the treatment of the exit face 212 is sufficient of itself to authorize connection of the assembly 200 with the complementary assembly 100.

Figure 8:
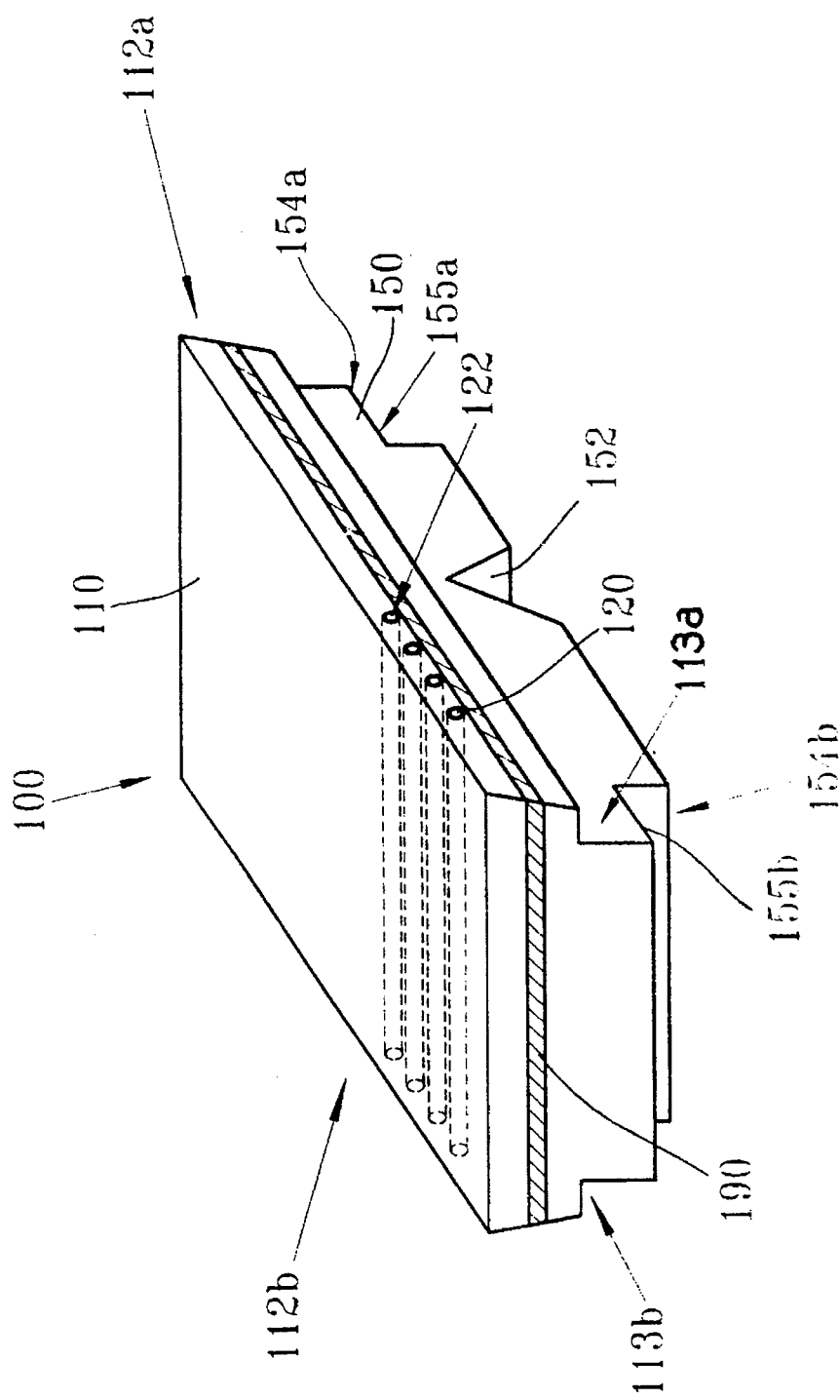
FIG. 8 shows an alternative embodiment of a support in accordance with the present invention.

As shown in the appended FIG. 8, the supports 150 can include an axial V-groove 152 in the plane of symmetry and two rebates 154a, 154b each forming a bearing surface 155a, 155b opening onto the same lower face 157 and disposed on either side of the plane of symmetry 153. A support 150 of this kind allows connection with a complementary assembly of the symmetrical righthand plug or lefthand plug type. A support of this kind comprising two bearing surfaces 155a, 155b can be used for a multifiber/multifiber connection. In other words, the assembly comprising the support 150 with two rebates 154a, 154b is then disposed between two complementary assemblies each receiving a multifiber bundle to be connected.

Finally, in the context of the invention, a protective body is preferably disposed around the connection system after joining together the assemblies 100, 200, to provide the necessary mechanical and environmental characteristics.

Of course the present invention is not limited to the specific embodiments just described but encompasses any variant thereof within the spirit of the invention.

For example, the pegs 252, 255 can be on the support 150 carrying the ferrule wafer 110 and, conversely, the V-groove 152 and the bearing surface 155 can be on the support 250 associated with the substrate 210.

In a further variant grooves 152 and bearing surfaces 155 can be provided on both substrates 150, 250 with pegs 252, 255 disposed in said grooves 152 and against said bearing surfaces 155 and independently immobilized by the leaf spring 550.

Also, the invention is not limited to the connection of optical fibers assembled onto the wafer 110 of the assembly 100 to the optical waveguides 220 of a substrate 210. The invention can also be used to connect directly two assemblies 100 with ferrules receiving the fibers of respective bundles or to connect indirectly two such assemblies 100 with ferrules receiving the fibers of respective bundles through the intermediary of a complementary termination inserted between them.

There is claimed:

1. Multichannel optical connection process, in particular for optical fibers, comprising the following steps:

making a multichannel optical connection wafer having a plurality of optical outlets disposed on a common face in a predetermined configuration and with a precise pitch, disposing said connection wafer on a support having mechanical positioning means, placing an assembly comprising said connection wafer and said support facing a reference termination comprising a reference base having mechanical positioning means adapted to cooperate with those of said support to define a unique relative position between them and a multichannel optical connection reference plate fixed rigidly to said base and having on a common face at least two optical outlets disposed in the same predetermined configuration as said connecting wafer, dynamically aligning two outlets of said connection wafer with respective outlets of said connection plate by three independent relative movements between said connection wafer and the associated support, and fixing said connection wafer to said support when said alignment is obtained.

2. Process according to claim 1 further comprising the step of making a second assembly comprising a multichannel optical connection wafer and a support comprising mechanical positioning means by means of the steps of claim 1 and a step of joining together the two assemblies so obtained by means of their respective mechanical positioning means.

3. Process according to claim 1 consisting in assembling together two assemblies receiving respective optical fibers.

4. Process according to claim 1 consisting connecting an assembly receiving optical fibers to an assembly having a substrate having optical waveguides.

5. Process according to claim 1 consisting in connecting two assemblies having fibers or optical waveguides to an intermediate assembly.

6. Process according to claim 1 wherein said reference termination is a universal termination used to align successive connection wafers of different assemblies.

7. Process according to claim 1 wherein said reference termination is a connection assembly comprising a connection wafer and a support.

8. Process according to claim 1 wherein said connection wafer and said reference base of said reference termination constitute a single member.

9. Process according to claim 1 wherein said predetermined configuration of said optical outlets of said connection wafer corresponds to a coplanar disposition of the axes of said outlets.

10. Process according to claim 1 wherein said two aligned outlets of said connection wafer comprise an outlet disposed substantially in a plane of symmetry of said predetermined configuration and a second outlet that is not in said plane of symmetry.

11. Process according to claim 1 wherein said three independent relative displacements between said connection wafer and the associated support consists in microdisplacements along two mutually orthogonal axes orthogonal to the axis of said optical waveguides followed by rotation about an axis substantially coincident with a central optical waveguide of said predetermined configuration.

12. Process according to claim 1 comprising the steps of fabricating a multichannel optical connection wafer by steps consisting in:

placing parallel ferrules on a reference surface, positioning said ferrules by means of a member having V-grooves, and molding a thermoplastics material over the positioned ferrules.

13. Process according to claim 12 further comprising the step of placing a locating member opposite the ends of said ferrules, which locating member has cones engaged in the ends of said ferrules, before carrying out said molding step.

14. Process according to claim 12 further comprising the step of cutting the end of said ferrules emerging from the molded part.

15. Process according to claim 1 further comprising the step of machining the common face of two connection wafers on to which said optical outlets open in a plane inclined to a plane normal to the axes of said optical outlets provided in said connection wafers.

16. Process according to claim 15 wherein the machining operation is carried out on two opposite faces of said connecting wafer.

17. Process according to claim 1 further consisting in placing an index matching product between two assemblies each comprising a connection wafer and a support before joining them together.

18. Process according to claim 1 further consisting in placing a protective body around two assemblies each comprising a connection wafer and a support when joined together.

19. Reference termination for implementing the process according to claim 1 comprising a reference base having mechanical positioning means adapted to cooperate with those of a support to define a unique relative position between said reference base and said support and a multichannel optical connection reference plate fixed rigidly to said base and having on a common face at least two optical outlets disposed in the same predetermined configuration as a connection wafer.

20. Termination according to claim 19 wherein said reference termination and said reference plate are combined in a single member.

21. Multichannel optical connection process, in particular for optical fibers, comprising the following steps:

making a multichannel optical connection wafer having a plurality of optical outlets disposed on a common face in a predetermined configuration and with a precise pitch, disposing said connection wafer on a support having mechanical positioning means, placing an assembly comprising said connection wafer and said support facing a reference termination comprising a reference base having mechanical positioning means adapted to cooperate with those of said support to define a unique relative position between them and a multichannel optical connection reference plate fixed rigidly to said base and having on a common face at least two optical outlets disposed in the same predetermined configuration as said connecting wafer, dynamically aligning two outlets of said connection wafer with respective outlets of said connection plate by three independent relative movements between said connection wafer and the associated support, and fixing said connection wafer to said support when said alignment is obtained wherein said mechanical positioning means comprise a precision cylindrical peg on said support or said reference base and a V-groove on said reference base or said support, respectively.

22. Process according to claim 21 wherein said mechanical positioning means further comprise a precision cylindrical peg on said support or said reference base and a bearing plane on said reference base or said support, respectively.

23. Process according to claim 21 wherein two cylindrical pegs are on said support or on said reference base and said bearing plane is on said reference base or on said support, respectively.

24. Process according to claim 21 wherein two cylindrical pegs are on said support or on said reference base and said V-groove is on said reference base or said support, respectively.

25. Process according to claim 21 wherein a plane of symmetry of said predetermined configuration is substantially coincident with a plane of symmetry of said V-groove and/or of the associated cylindrical peg.

26. Multichannel optical connection process, in particular for optical fibers, comprising the following steps:

making a multichannel optical connection wafer having a plurality of optical outlets disposed on a common face in a predetermined configuration and with a precise pitch, disposing said connection wafer on a support having mechanical positioning means, placing an assembly comprising said connection wafer and said support facing a reference termination comprising a reference base having mechanical positioning means adapted to cooperate with those of said support to define a unique relative position between them and a multichannel optical connection reference plate fixed rigidly to said base and having on a common face at least two optical outlets disposed in the same predetermined configuration as said connecting wafer, dynamically aligning two outlets of said connection wafer with respective outlets of said connection plate by three independent relative movements between said connection wafer and the associated support, and fixing said connection wafer to said support when said alignment is obtained wherein said mechanical positioning means further comprise a precision cylindrical peg on said support or said reference base and a bearing plane on said reference base or said support, respectively.

27. Process according to claim 26 wherein said mechanical positioning means comprise a precision cylindrical peg on said support or said reference base and a V-groove on said reference base or said support, respectively.

28. Process according to claim 27 wherein two cylindrical pegs are on said support or on said reference base and said V-groove is on said reference base or said support, respectively.

29. Process according to claim 27 wherein a plane of symmetry of said predetermined configuration is substantially coincident with a plane of symmetry of said V-groove and/or of the associated cylindrical peg.

30. Process according to claim 26 wherein two cylindrical pegs are on said support or on said reference base and said bearing plane is on said reference base or on said support, respectively.

31. Multichannel optical connection process, in particular for optical fibers, comprising the following steps:

making a multichannel optical connection wafer having a plurality of optical outlets disposed on a common face in a predetermined configuration and with a precise pitch, disposing said connection wafer on a support having mechanical positioning means, placing an assembly comprising said connection wafer and said support facing a reference termination comprising a reference base having mechanical positioning means adapted to cooperate with those of said support to define a unique relative position between them and a multichannel optical connection reference plate fixed rigidly to said base and having on a common face at least two optical outlets disposed in the same predetermined configuration as said connecting wafer, dynamically aligning two outlets of said connection wafer with respective outlets of said connection plate by three independent relative movements between said connection wafer and the associated support fixing said connection wafer to said support when said alignment is obtained, and joining together two assemblies each comprising a connection wafer and a support by means of a leaf spring holding the respective mechanical positioning means of said two assemblies in interengagement.

\* \* \* \* \*